No. 607,983. Patented July 26, 1898.
G. T. COOPER.
SANITARY TRAP.
(Application filed Aug. 19, 1897.)
(No Model.)
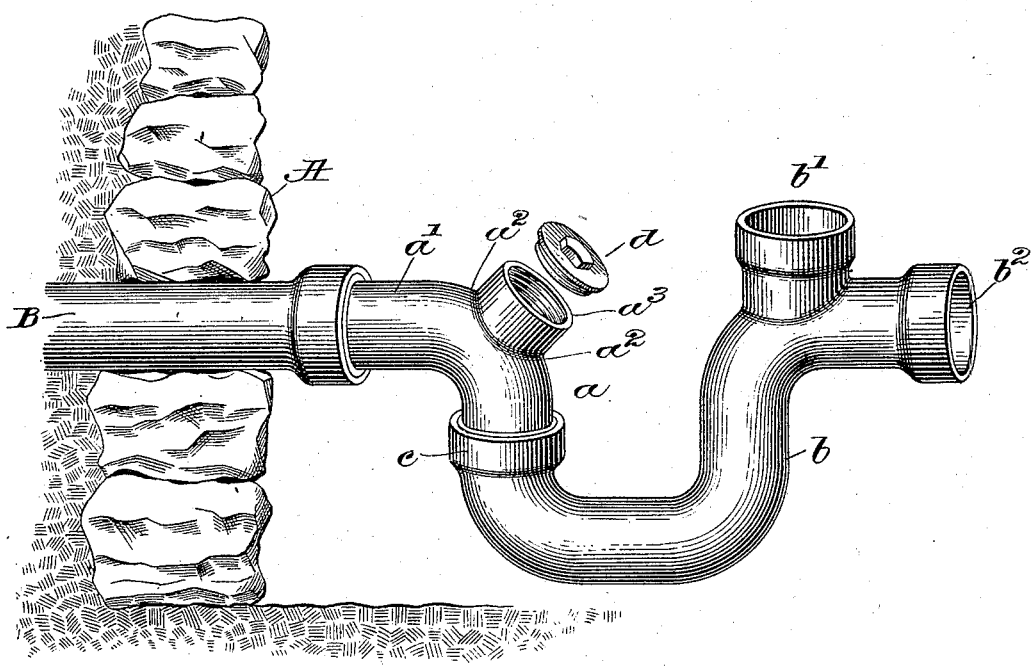

UNITED STATES PATENT OFFICE.

GEORGE T. COOPER, OF NATICK, MASSACHUSETTS, ASSIGNOR OF ONE-HALF TO HERMAN F. JACOBS, OF SAME PLACE.

SANITARY TRAP.

SPECIFICATION forming part of Letters Patent No. 607,983, dated July 26, 1898.

Application filed August 19, 1897. Serial No. 648,789. (No model.)

*To all whom it may concern:*

Be it known that I, GEORGE T. COOPER, of Natick, county of Middlesex, State of Massachusetts, have invented an Improvement in Sanitary Traps, of which the following description, in connection with the accompanying drawing, is a specification, like letters on the drawing representing like parts.

This invention has for its object the production of a novel trap which may be easily adjusted in any direction and may be easily cleaned.

This improved trap consists of two parts, one of which, say the outer part, may be connected to a pipe leading to a sewer or other catch-basin, while the other, or inner part, is free to turn on the outer part, say within the cellar. The two parts together present a U-shaped trap. The inner upturned extremity of the trap presents an opening for the reception of the usual vertical vent-pipe and a second opening to be connected with a closet or other fixture, while in the angle of the bend joining one leg of the U with the horizontal extension forming part of the outer end of the U I have placed a screw-plug, which may be removed when desired, the opening closed by said plug being so located with relation to one branch of the U and its horizontal extension that when said plug is removed ready access may be had to both the U and the horizontal extension as well as to the pipe between the trap and the sewer.

The drawing shows a trap embodying my invention.

In the drawing let A represent the cellar-wall, and B part of an outside pipe leading to any sewer or catch-basin, the inner end of said pipe terminating at or near the said wall.

The trap is composed of an outer part $a$ and an inner part $b$, the inner part being jointed at $c$ to the outer part, so that said inner part may be turned thereon in any direction horizontally and when in proper position be lead-jointed. The outer part presents a horizontal portion $a'$, a bend $a^2$, and a threaded collar $a^3$. The inner portion $b$ presents a U-shaped bend, provided with an opening $b'$ for the reception of a vent-pipe, and substantially at right angles to it an opening $b^2$, to which to connect a pipe leading from any closet, sink, or other fixture or stand. The shorter leg of the U is shaped at $c$ to receive one end of the outer part of the trap. This threaded portion $a^3$ is normally closed by a plug $d$, threaded to be screwed into the collar $a^3$, and said collar, it constituting a cleaning-opening, is so located that when the plug is removed ready access may be had to the horizontal outer portion $a'$, and also to the short arm of the U-shaped leg, and also to the main pipe B.

Sewer and other pipes frequently approach the cellar-wall in an angular position, and when such is the case difficulty is occasioned in putting the trap in the right position; but in this my plan the angular presentation of the sewer-pipe can effect no harm.

I am aware that various connections have heretofore been proposed, certain of which have clean-outs and vent connections; but I believe that it is new with me to have a vertical pipe connection at the elbow of the inner portion of a trap which is to be connected to the house connection, said inner portion having a union or joint $c$, by means of which it may be swung horizontally entirely out of line with the sewer end of the trap, the latter end or outer portion of the trap having a clean-out $a^3$ which is substantially in line with both the trap and the sewer connection.

It will be observed that in my invention the vent connection $b'$ is not only vertical, so that it cannot possibly get clogged and also so that the vent-pipe may be inserted without inconvenience no matter into what angular position it be necessary or desirable to swing the inner portion of the trap relatively to the outer portion thereof, but also that the vent connection $b'$ is a considerable radial distance from the clean-out, so that a relatively short deflection or swinging of the said inner portion $b$ on its joint $c$ as a pivot will entirely remove it from all possible interference with the proper cleaning out of the sewer-pipe B through the clean-out.

Having described my invention, what I claim as new, and desire to secure by Letters Patent, is—

The herein-described trap, comprising an inner portion for the house connection, having a U-shaped bend terminating at its inner end in a horizontal part, and having at the elbow formed by said horizontal part with the adjacent vertical leg of the U-bend a vertical vent connection, and an outer part for the sewer connection, said outer part having a vertical end for union with the outer end of the said U-bend, and a horizontal end for union with the sewer connection, and having a clean-out opening at its elbow in line with both the trap and the sewer connection, the joint of the said inner portion and outer portion being below the water-line of the trap and the said vertical vent of the said inner portion being a considerable radial distance from the said clean-out of the outer portion so that horizontally turning the inner portion on said joint as a center entirely removes the vent connection from possible interference with free access to the sewer through the said clean-out, substantially as described.

In testimony whereof I have signed my name to this specification in the presence of two subscribing witnesses.

GEORGE T. COOPER.

Witnesses:
GEO. W. GREGORY,
AUGUSTA E. DEAN.